(12) United States Patent
Senbongi et al.

(10) Patent No.: US 10,801,494 B2
(45) Date of Patent: Oct. 13, 2020

(54) HYDRAULIC CONTROL APPARATUS AND HYDRAULIC CONTROL METHOD

(71) Applicants: YAMADA MANUFACTURING CO., LTD., Kiryu-shi, Gunma (JP); KEIHIN CORPORATION, Tokyo (JP)

(72) Inventors: Yuji Senbongi, Kiryu (JP); Kenichi Fujiki, Kiryu (JP); Toru Kobayashi, Kiryu (JP); Ken Kaneko, Kiryu (JP); Takahiro Satou, Kiryu (JP); Haruyo Kobayashi, Kiryu (JP); Yoshiharu Segawa, Shioya (JP); Naoki Oikawa, Shioya (JP); Syu Murayama, Shioya (JP); Kentaro Yamanaka, Shioya (JP); Yuhki Jyo, Shioya (JP)

(73) Assignees: YAMADA MANUFACTURING CO., LTD., Kiryu-Shi (JP); KEIHIN CORPORATION, Tokyo (JP)

( * ) Notice: Subject to any disclaimer, the term of this patent is extended or adjusted under 35 U.S.C. 154(b) by 335 days.

(21) Appl. No.: 15/951,646

(22) Filed: Apr. 12, 2018

(65) Prior Publication Data
US 2019/0017596 A1 Jan. 17, 2019

(30) Foreign Application Priority Data
Jul. 12, 2017 (JP) .................................. 2017-136601

(51) Int. Cl.
*F04C 14/22* (2006.01)
*F04C 2/344* (2006.01)
(Continued)

(52) U.S. Cl.
CPC ............ *F04C 14/223* (2013.01); *F04C 2/344* (2013.01); *F04C 2/3442* (2013.01); *F04C 14/22* (2013.01);
(Continued)

(58) Field of Classification Search
CPC ...... F04C 14/226; F04C 2/344; F04C 2/3442; F04C 14/223; F04C 14/24;
(Continued)

(56) References Cited

U.S. PATENT DOCUMENTS 8,522,542 B2 * 9/2013 Kimura ................. F04B 49/125
60/443
8,555,628 B2 * 10/2013 Yamamuro ............ B62D 5/062
418/24
(Continued)

FOREIGN PATENT DOCUMENTS

JP 2010-526237 7/2010
WO 2008/137037 11/2008

*Primary Examiner* — Peter J Bertheaud
(74) *Attorney, Agent, or Firm* — Rankin, Hill & Clark LLP (57) ABSTRACT

A hydraulic control apparatus is provided including: an electromagnetic valve that has an input port communicating with a supply destination unit of oil and a control port that is switched between communication and disconnection by resultant force of a hydraulic pressure of the supply destination unit and electromagnetic force; a variable displacement pump which has a suction port communicating with a supply source of the oil, an ejection port communicating with the supply destination unit, and a control chamber communicating with the control port and rotates in accordance with drive of the supply destination unit, in which an amount of the oil ejected to the supply destination unit through the ejection port changes in accordance with a pressure in the control chamber; and a control unit that controls a value of a necessary current that is caused to flow through the electromagnetic valve.

5 Claims, 5 Drawing Sheets

(51) Int. Cl.
*F04C 14/24* (2006.01)
*F16H 61/431* (2010.01)
*F01M 1/02* (2006.01)
*F01M 1/16* (2006.01)

(52) U.S. Cl.
CPC ............ *F04C 14/226* (2013.01); *F04C 14/24* (2013.01); *F01M 1/02* (2013.01); *F01M 1/16* (2013.01); *F01M 2001/023* (2013.01); *F01M 2001/0223* (2013.01); *F01M 2001/0238* (2013.01); *F01M 2001/0246* (2013.01); *F04C 2210/14* (2013.01); *F04C 2210/206* (2013.01); *F04C 2270/185* (2013.01); *F16H 61/431* (2013.01)

(58) Field of Classification Search
CPC ................ F04C 2270/185; F04C 14/22; F04C 2210/206; F04C 2210/14; F01M 2001/0238; F01M 2001/0246; F01M 1/02; F01M 1/16
See application file for complete search history.

(56) References Cited

U.S. PATENT DOCUMENTS

| | | | | |
|---|---|---|---|---|
| 8,684,702 | B2* | 4/2014 | Watanabe | F04C 14/223 |
| | | | | 417/220 |
| 8,714,298 | B2* | 5/2014 | Kimura | B62D 6/02 |
| | | | | 180/441 |
| 9,133,842 | B2* | 9/2015 | Watanabe | F04C 14/223 |
| 9,243,632 | B2* | 1/2016 | Saga | F04C 14/226 |
| 9,874,209 | B2* | 1/2018 | Mauser | F04C 2/344 |
| 10,197,055 | B2* | 2/2019 | Honda | F04C 14/226 |
| 2016/0377078 | A1* | 12/2016 | Akatsuka | F04C 14/26 |
| | | | | 417/310 |
| 2017/0227007 | A1* | 8/2017 | Akatsuka | F04C 2/3446 |

* cited by examiner

HYDRAULIC CONTROL APPARATUS AND HYDRAULIC CONTROL METHOD

CROSS-REFERENCE TO RELATED APPLICATION

Priority is claimed on Japanese Patent Application No. 2017-136601, filed Jul. 12, 2017, content of which is incorporate herein by reference.

BACKGROUND

Field

The present invention relates to a hydraulic control apparatus and a hydraulic control method.

Description of Related Art

In a hydraulic control apparatus that supplies oil to an engine of a vehicle or the like, the amount of ejection from a driven pump is controlled in response to rotation of the engine. In this manner, the hydraulic control apparatus is configured such that oil is supplied to the engine at a desired hydraulic pressure regardless of the rotational speed of the engine.

For example, Published Japanese Translation No. 2010-526237 of the PCT International Publication (hereinafter referred to as Patent Document 1) discloses a configuration in which a solenoid valve and a variable displacement pump are provided as the aforementioned hydraulic control apparatus.

The solenoid valve has an input port that communicates with an engine and a control port that switches between communication and disconnection in accordance with resultant force of a hydraulic pressure and electromagnetic force.

A vane pump is employed for the variable displacement pump. Specifically, the variable displacement pump has a suction port that communicates with an oil supply source, an ejection port and a control port that communicate with the engine, and a control chamber into which the oil flows through the ejection port and the control port.

The variable displacement pump is driven in response to rotation of the engine, and the amount of oil ejected to the engine through the ejection port changes in accordance with a hydraulic pressure in the control chamber.

The electromagnetic force of the aforementioned solenoid valve is controlled by a control unit. In this case, the control of the electromagnetic force is typically performed by feedback control. That is, the control unit calculates a value of a current that is made to flow through an electromagnetic valve such that a deviation between a target hydraulic pressure value calculated from a parameter (a rotational speed, an accelerator position, or the like) indicating a state of the engine and an actually measured hydraulic pressure value of the engine (main gallery pressure) approaches zero.

SUMMARY

However, according to the technology of Patent Document 1, it is necessary to cause the current value to constantly change on the basis of the actually measured hydraulic pressure value. Therefore, it is necessary to provide a highly precise hydraulic pressure sensor in order to achieve both responsiveness and stability (transient characteristics) when the engine is in a transient state at the time of acceleration or deceleration or due to an external factor, for example, which leads to complication of the control itself. As a result, there is a problem that this leads to an increase in cost.

Aspects of the present invention provide a hydraulic control apparatus and a hydraulic control method that enable supply of oil to a supply destination, such as an engine, at a desired hydraulic pressure at a lower cost with more simplified control.

(1) According to an aspect of the present invention, there is provided a hydraulic control apparatus including: an electromagnetic valve that has an input port communicating with a supply destination unit of oil and a control port in which a communication and a disconnection are switched by a resultant force of a hydraulic pressure of the supply destination unit and an electromagnetic force; a variable displacement pump which has a suction port communicating with a supply source of the oil, an ejection port communicating with the supply destination unit, and a control chamber communicating with the control port, rotates in accordance with a drive of the supply destination unit, and is where an amount of the oil ejected to the supply destination unit through the ejection port changes in accordance with a pressure in the control chamber; and a control unit that controls a value of a necessary current applying to the electromagnetic valve, in which the control unit calculates a target hydraulic pressure value of the supply destination unit on the basis of a parameter indicating a state of the supply destination unit and calculates the value of the necessary current on the basis of a map indicating a correlation between the target hydraulic pressure value and the value of the necessary current.

(2) In the aforementioned aspect (1), the map may be set such that the value of the necessary current decreases as the target hydraulic pressure value increases, and the electromagnetic valve may cause the control port and the control chamber to communicate with each other in a case in which the resultant force is equal to or greater than a threshold value for communication.

(3) In the aforementioned aspect (1) or (2), the variable displacement pump may include a housing that has the suction port and the ejection port, a cam ring that communicates with the suction port and the ejection port, sections the control chamber defined between the cam ring and the housing from the suction port and the ejection port, and is able to move in a direction in which the control chamber expands or contracts, a rotor configured to rotate about an axial line perpendicularly intersecting a moving direction of the cam ring inside of the cam ring, and a plurality of vanes that are supported by the rotor to advance or retreat in a radial direction perpendicularly intersecting the axial line with a movement of the cam ring and that have outer end surfaces in the radial direction sliding an inner circumferential surface of the cam ring, wherein an outer circumferential surface of the cam ring may have a pressure receiving surface on which an ejection pressure of oil ejected from the ejection port acts, and a pressing surface that faces the pressure receiving surface and is pressed against an opening surface of the suction port in an inner surface of the housing in response to the ejection pressure.

(4) In one of the aforementioned aspects (1) to (3), the hydraulic pressure of the supply destination unit and the electromagnetic force may act in a same direction, and the control unit may reduce a current applying to the electromagnetic valve in a case in which the hydraulic pressure of the supply destination unit is equal to or less than a lower limit threshold value.

(5) In one of the aforementioned aspects (1) to (4), the hydraulic pressure of the supply destination unit and the electromagnetic force may act in a same direction, and the control unit may increase a current applying to the electromagnetic valve in a case in which the hydraulic pressure of the supply destination unit is equal to or greater than an upper limit threshold value.

(6) According to an aspect of the present invention, there is provided a hydraulic control method for a hydraulic control apparatus including: an electromagnetic valve that has an input port communicating with a supply destination unit of oil and a control port in which a communication and a disconnection are switched by a resultant force of a hydraulic pressure of the supply destination unit and an electromagnetic force; a variable displacement pump which has a suction port communicating with a supply source of the oil, an ejection port communicating with the supply destination unit, and a control chamber communicating with the control port, rotates in accordance with a drive of the supply destination unit, and is where an amount of the oil ejected to the supply destination unit through the ejection port changes in accordance with a pressure in the control chamber; and a control unit that controls a value of a necessary current applying to the electromagnetic valve, the method including causing the control unit to perform: a target hydraulic pressure value calculation step of calculating a target hydraulic pressure value of the supply destination unit on the basis of a parameter indicating a state of the supply destination unit; and a necessary current value calculation step of calculating the value of the necessary current on the basis of a map indicating a correlation between the target hydraulic pressure value and the value of the necessary current.

According to the aforementioned aspects (1) and (6), since the current of the value of the necessary current calculated on the basis of the map is caused to flow through the electromagnetic valve, it is possible to cause the hydraulic pressure of the supply destination unit to quickly approach the required target hydraulic pressure value. In this case, it is possible to satisfy transient characteristics at a lower cost with more simplified control as compared with a case in which the value of the necessary current is constantly changed on the basis of the target hydraulic pressure value and the actually measured hydraulic pressure value. As a result, it is possible to supply oil to the supply destination unit at a desired hydraulic pressure as in feedback control.

According to the aforementioned aspect (2), since the target hydraulic pressure value decreases when the value of the necessary current is increased, it is possible to supply the oil to the supply destination unit at the desired hydraulic pressure regardless of the drive of the supply destination unit (for example, the rotational speed of the engine) that powers the variable displacement pump.

According to the aforementioned aspect (3), it is possible to press the pressing surface against the opening surface of the suction port by a pressing load that acts on the pressure receiving surface due to the ejection pressure. In this manner, it is possible to reliably seal the control chamber and the suction port.

According to the aforementioned aspect (4), since the hydraulic pressure of the supply destination unit necessary to cause the control port to communicate increases when the value of the current that flows through the electromagnetic valve is reduced, it is possible to forcibly increase the amount of ejection regardless of the target hydraulic pressure value. In this manner, it is possible to prevent the hydraulic pressure of the supply destination unit from being in an extremely dropping state and to maintain the hydraulic pressure of the supply destination unit within a desired range. Even in a case in which a pressure switch is provided for performing the aforementioned control, it is possible to secure the advantage in terms of cost as compared with a case in which a pressure sensor is provided as in feedback control since the pressure switch is relatively inexpensive.

According to the aforementioned aspect (5), since the hydraulic pressure of the supply destination unit necessary to cause the control port to communicate decreases when the value of the current that flows through the electromagnetic valve is increased, it is possible to forcibly reduce the amount of ejection regardless of the target hydraulic pressure value. In this manner, it is possible to prevent the hydraulic pressure of the supply destination unit from being in an extremely boosted state and to maintain the hydraulic pressure of the supply destination unit within a desired range. Even in a case in which a pressure switch is provided for performing the aforementioned control, it is possible to secure the advantage in terms of cost as compared with a case in which a pressure sensor is provided as in feedback control since the pressure switch is relatively inexpensive.

According to the aspect of the present invention, it is possible to supply oil to a drive source at a desired hydraulic pressure at a lower cost with more simplified control.

DESCRIPTION OF EMBODIMENTS

Hereinafter, an embodiment of the present invention will be described on the basis of drawings. In the embodiment, a configuration in which a hydraulic control apparatus according to the present invention is mounted on an engine will be described as an example of a hydraulic control system.

[Hydraulic Control System]

Figure 1:
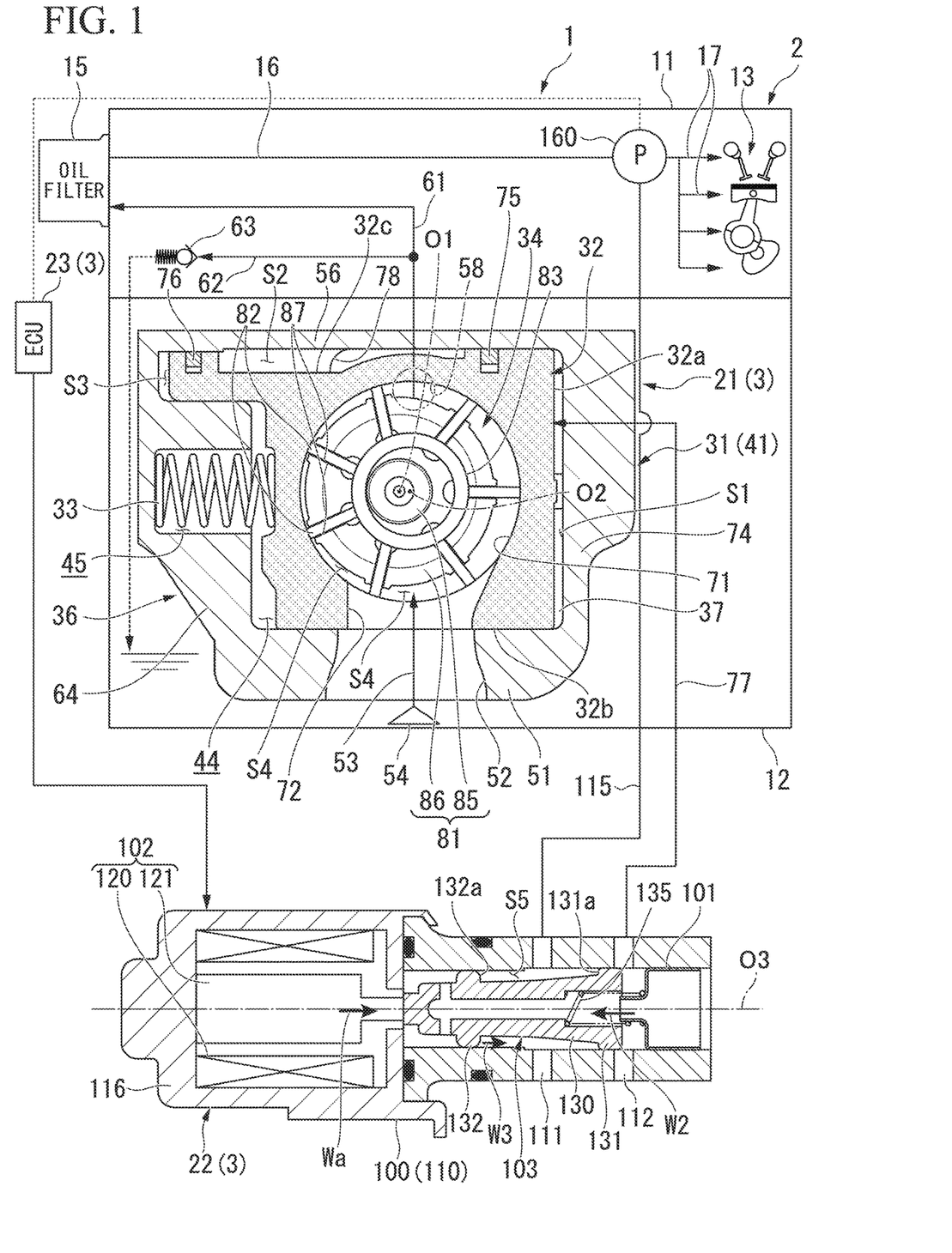
FIG. 1 is a block diagram of a hydraulic control system according to an embodiment.

FIG. 1 is a block diagram of a hydraulic control system 1.

As illustrated in FIG. 1, the hydraulic control system 1 according to the embodiment includes an engine (supply destination unit) 2 and a hydraulic control apparatus 3.

<Engine>

The engine 2 has an engine main body 11 defined by a cylinder head and a cylinder block and an oil pan (oil supply source) 12 attached to a lower portion of the engine main body 11.

In the engine main body 11, various lubrication members and cooling members that are oil supply targets 13 and a hydraulic pressure device are accommodated. Examples of the supply targets 13 include a piston, a crank shaft, a cam shaft, a valve timing control system (VTC), and the like. Oil that has passed through an oil filter 15 passes through a main gallery 16 and is then supplied to the supply targets 13 through each distribution flow path 17. The oil that has been supplied to the supply targets 13 passes through the supply targets 13 and is then returned to the oil pan 12.

<Hydraulic Control Apparatus>

The hydraulic control apparatus 3 includes a variable displacement pump 21, a solenoid valve (electromagnetic valve) 22, and an engine control unit (ECU) 23 corresponding to a control unit.

<Variable Displacement Pump>

The variable displacement pump 21 is configured to rotate in response to rotation of the engine 2 (crank shaft) and to be able to change the amount (pump capacity) of oil ejected when the engine 2 rotates once. A vane pump, for example, is used as the variable displacement pump 21.

The variable displacement pump 21 has a housing 31 and a cam ring 32, a cam spring 33, and a pump unit 34 that are accommodated in the housing 31.

The housing 31 has a surrounding wall portion 36 with a rectangular frame shape in a front view (in the vertical direction in the drawing) and a first end portion 37 and a second end portion (not illustrated) that block opening portions at both ends of the surrounding wall portion 36. The housing 31 is divided into a pump body 41 with a box shape that forms the surrounding wall portion 36 and the first end portion 37 and a cover that blocks an opening portion of the pump body y41 and forms the second end portion.

A pump accommodation unit 44 that accommodates the cam ring 32 and the pump unit 34 and a spring accommodation unit 45 that communicates with the pump accommodation unit 44 are defined in the housing 31.

The pump accommodation unit 44 is formed into a rectangular shape in a front view. A suction port 52 that penetrates through a first wall portion 51 is formed in the first wall portion 51 in the surrounding wall portion 36. The suction port 52 causes the inside of the pump accommodation unit 44 to communicate with the inside of the oil pan 12 through a suction flow path 53. A strainer 54 is connected to an upstream end portion of the suction flow path 53.

An ejection port 58 is formed in the housing 31. The ejection port 58 opens in a second wall portion 56 that faces the first wall portion 51, for example, in the surrounding wall portion 36. The ejection port 58 causes the inside of the pump accommodation unit 44 to communicate with the aforementioned oil filter 15 through a supply flow path 61. In the embodiment, an emergency flow path 62 extending toward the oil pan 12 is branched from the supply flow path 61. An emergency valve 63 is provided on the emergency flow path 62. The emergency flow path 62 opens the emergency valve 63 when an excessive pressure occurs in the supply flow path 61 and causes the supply flow path 61 to communicate with the inside of the oil pan 12. In this manner, the oil in the supply flow path 61 flows out to the oil pan 12 through the emergency flow path 62 and releases the pressure in the supply flow path 61.

The spring accommodation unit 45 is formed into a smaller rectangular shape than the pump accommodation unit 44 in a front view. The spring accommodation unit 45 is formed in a third wall portion 64 that bridges the first wall portion 51 and the second wall portion 56 in the aforementioned surrounding wall portion 36. The spring accommodation unit 45 opens in the pump accommodation unit 44 on an inner surface of the third wall portion 64.

The cam ring 32 is formed into a square cylindrical shape that has a circular through-hole 71 in a front view. The cam ring 32 is configured to be able to slide in a direction in which the cam ring 32 moves toward and away from the aforementioned third wall portion 64 in the pump accommodation unit 44. In the pump accommodation unit 44, a control chamber S1 is defined between a fourth wall portion 74 that faces the third wall portion 64 and the cam ring 32.

The control chamber S1 is configured such that the oil can be supplied from the solenoid valve 22 through a control flow path 77. The cam ring 32 causes the control chamber S1 to expand and contract by sliding in response to a pressure occurring in the control chamber S1 (hereinafter referred to as a "control pressure Pa"). That is, a facing surface that faces an inner surface of the fourth wall portion 74 in the cam ring 32 functions as a control surface 32a that receives the control pressure Pa.

A suction communication path 72 is formed at a portion of the cam ring 32 facing the first wall portion 51. The suction communication path 72 causes the inside of the through-hole 71 to communicate with the inside of the suction port 52. A pair of chip seals (a first chip seal 75 and a second chip seal 76) that tightly adhere to the inner surface of the second wall portion 56 are attached to a portion of the cam ring 32 facing the second wall portion 56. A pressure chamber S2 is defined at a portion defined by the cam ring 32, the second wall portion 56, and each of the chip seals 75 and 76, in the pump accommodation unit 44. The pressure chamber S2 communicates with the inside of the through-hole 71 through an ejection communication path 78 formed at the first end portion 37, for example, and communicates with the aforementioned ejection port 58.

An ejection pressure Pb acts on the pressure chamber S2 by the oil, which is sent from the pump unit 34, flowing into the pressure chamber S2. Therefore, the cam ring 32 is pressed toward the first wall portion 51 by the ejection pressure Pb occurring in the pressure chamber S2. That is, the facing surface of the cam ring 32, which faces the inner surface of the first wall portion 51, functions as a pressing surface 32b that sections the control chamber S1 and the suction port 52 and moves along the inner surface of the first wall portion 51 with sliding of the cam ring 32. The facing surface of the cam ring 32, which faces the inner surface of the second wall portion 56, functions as a pressure receiving surface 32c that receives the ejection pressure Pb.

The cam ring 32 sections the pressure chamber S2 (ejection port 58) and the control chamber S1 via the first chip seal 75. That is, the cam ring 32 sections the control chamber S1 and the ejection port 58 and sections the control chamber S1 and the suction port 52. An opened chamber S3 on which an atmospheric pressure acts is formed between the cam ring 32 and the third wall portion 64 in the pump accommodation unit 44. The cam ring 32 sections the pressure chamber S2 and the opened chamber S3 via the second chip seal 76.

The cam spring 33 is accommodated in the spring accommodation unit 45. Specifically, the cam spring 33 is interposed between the inner surface of the spring accommodation unit 45 and the surface that faces the third wall portion 64 of the cam ring 32 in an elastically deformed state. That is, a predetermined cam set load W1 is applied to the cam spring 33. Therefore, the cam spring 33 constantly biases the cam ring 32 toward the fourth wall portion 74 (in the direction in which the control chamber S1 contracts).

The pump unit 34 is rotatably accommodated in the cam ring 32. Specifically, the pump unit 34 includes a rotor 81, a plurality of vanes 82, and a guide ring 83.

The rotor 81 includes a shaft 85 extending along an axial line O1 and a rotor core 86 fixed to the shaft 85.

The shaft 85 extends along the axial line O1 extending in a direction (the vertical direction in the drawing) perpendicularly intersecting the sliding direction of the cam ring 32. Both end portions of the shaft 85 in a pump axis direction along the axial line O1 are rotatably supported by the first end portion 37 and the second end portion. The shaft 85 is connected directly or indirectly to the crank shaft, for example. Therefore, the shaft 85 rotates in conjunction with rotation of the crank shaft.

The rotor core 86 is formed into a cylindrical shape with an outer diameter that is smaller than an inner diameter of the through-hole 71. The rotor core 86 is fitted onto the shaft 85 in the through-hole 71. A plurality of slits 87 that extend radially relative to the axial line O1 are formed at the rotor core 86. Each of the slits 87 opens in the outer circumferential surface of the rotor core 86.

The vanes 82 are accommodated in the aforementioned slits 87. The vanes 82 are configured to be able to slide in a pump radial direction perpendicularly intersecting the axial line O1. Tip end surfaces (outer end surfaces in the pump radial direction) of the vanes 82 are configured to move along the inner circumferential surface of the cam ring 32 with the rotation of the rotor 81.

Guide rings 83 are inserted onto both end portions (portions located further outward than the rotor core 86) of the shaft 85 in the pump axis direction (only one of the guide rings 83 is illustrated in FIG. 1). Each of the guide rings 83 has an outer diameter that is smaller than the outer diameter of the rotor core 86 and has an inner diameter that is greater than the outer diameter of the shaft 85. End surfaces of each vane 82 on the inner side in the pump diameter direction abuts outer circumferential surfaces of each guide ring 83 to be able to move along the surfaces. Therefore, a plurality of fan-shaped pump chambers S4 sectioned by the vanes 82 are defined between the inner circumferential surfaces of the rotor 81 and the cam ring 32 and the outer circumferential surfaces of the guide rings 83.

A region on the side of the suction communication path 72 relative to an intermediate portion between the suction communication path 72 and the ejection communication path 78 in a rotation direction of the rotor 81 (counterclockwise in the example illustrated in the drawing) in each of the aforementioned pump chambers S4 is a suction region. A region on the side of the ejection communication path 78 relative to the intermediate portion between the suction communication path 72 and the ejection communication path 78 in each pump chamber S4 is an ejection region. In the variable displacement pump 21, the amount of oil ejected from the ejection port 58 changes in accordance with a difference in an increase amount of volume of each pump chamber S4 from the suction communication path 72 to the intermediate portion in the suction region (a difference in a decrease amount of the volume of each pump chamber S4 from the intermediate portion to the ejection communication path 78 in the ejection region).

That is, in a case in which the cam ring 32 (control surface 32*a*) has approached the fourth wall portion 74 to the maximum extent, an axial line O2 of the guide ring 83 is in a most eccentric state relative to the axial line O1. At this time, the amount of ejection reaches the maximum because changes in volume of each pump chamber S4 reach their maxima. Specifically, the oil is suctioned into the pump chambers S4 through the suction communication path 72 by the volume of each pump chamber S4 increasing from the suction communication path 72 toward the intermediate portion. The oil is ejected from the pump chamber S4 through the ejection communication path 78 by the volume of each pump chamber S4 decreasing as each pump chamber S4 approaches the ejection communication path 78 from the intermediate portion.

Figure 2:
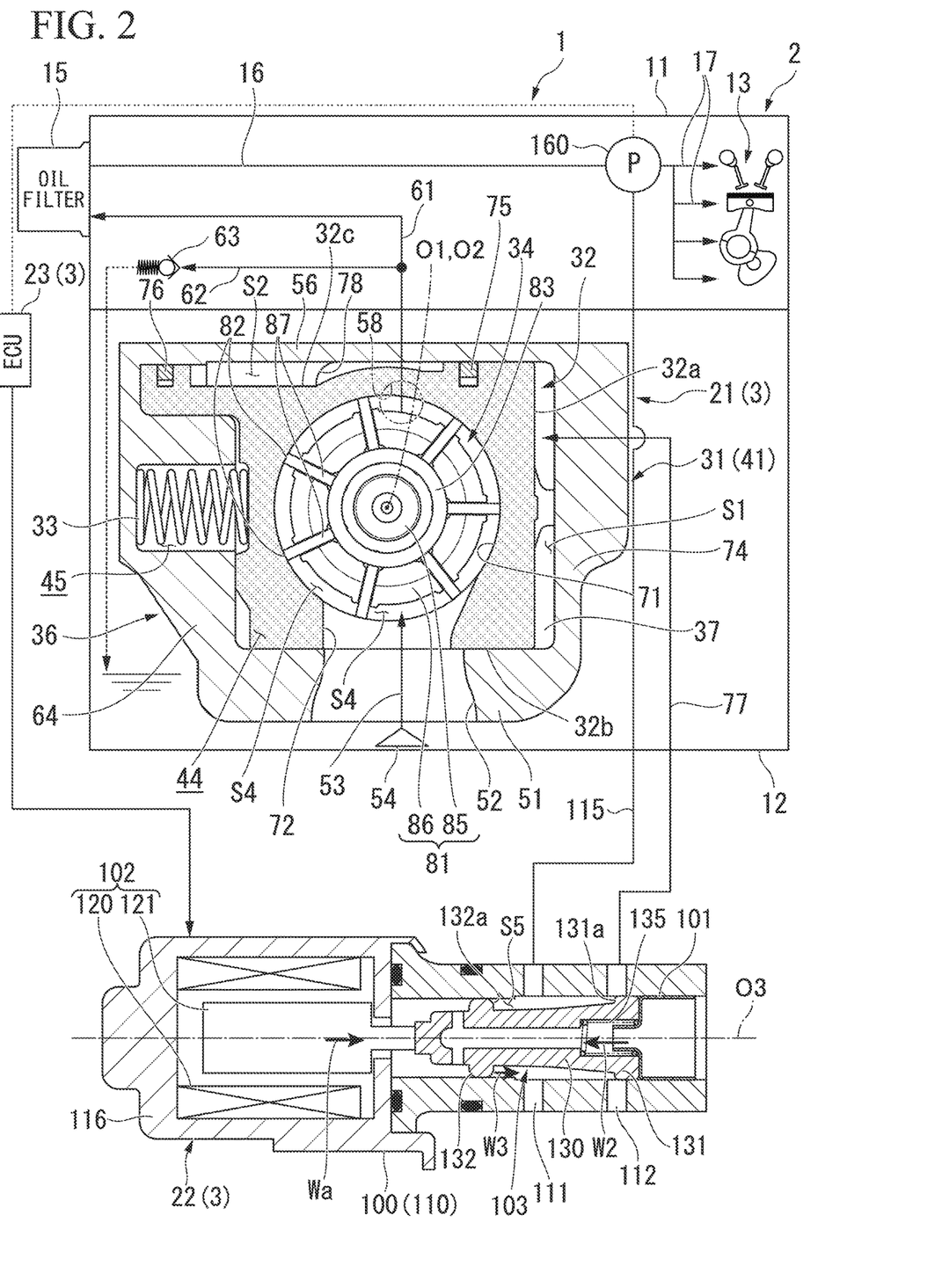
FIG. 2 is a block diagram of a hydraulic control system according to an embodiment.

FIG. 2 is a block diagram of the hydraulic control system 1 in a case in which the variable displacement pump 21 is at a concentric position.

As illustrated in FIG. 2, the volume of each pump chamber S4 changes in accordance with the amount of movement of the cam ring 32 in the variable displacement pump 21. Specifically, the amounts of eccentricity of the axial lines O1 and O2 contract as the cam ring 32 (control surface 32*a*) and the fourth wall portion 74 separate from each other. Therefore, the changes in the volume of each pump chamber S4 become smaller, and the amount of ejection decreases. In the variable displacement pump 21 according to the embodiment, the changes in the volume of each pump chamber S4 become zero, and the amount of ejection becomes zero in a case in which the axial lines O1 and O2 are arranged on the same axis (concentric position).

<Solenoid Valve>

As illustrated in FIG. 1, the solenoid valve 22 controls the control pressure Pa and controls the amount of ejection of the variable displacement pump 21 (the amount of eccentricity of the cam ring 32). Specifically, the solenoid valve 22 includes a valve body 100, a plug body 101, a solenoid 102, and a spool 103. In the embodiment, the solenoid valve 22 is integrally assembled with the housing 31 of the variable displacement pump 21. However, the solenoid valve 22 may be provided separately from the variable displacement pump 21.

The valve body 100 is formed into a bottomed cylindrical shape extending along an axial line O3. An input port 111 and a control port 112 penetrating through a surrounding wall portion 110 are formed in the surrounding wall portion 110 of the valve body 100. The ports 111 and 112 are arranged at an interval in the valve axis direction at portions located near the opening portion of the valve body 100 in the valve axis direction along the axial line O3 (hereinafter referred to as a "first side").

The input portion 111 communicates with the main gallery 16 through an input flow path 115.

The control portion 112 is positioned on the first side in the valve axis direction relative to the input port 111. The control port 112 communicates with the inside of the control chamber S1 through the control flow path 77. The shapes of the ports 111 and 112 can be appropriately changed to slit shapes extending in the valve circumferential direction about the axial line O3, circular holes, or the like.

The plug body 101 is fixed to a portion closer to the first side in the valve axis direction than to the control port 112 by press-fitting or the like in the surrounding wall portion 110 of the valve body 100.

The solenoid 102 is arranged at a portion closer to a bottom wall portion 116 in the valve body 100 (hereinafter referred to as a "second side" in the valve axis direction). Specifically, the solenoid 102 includes a coil 120 and a plunger 121.

The coil 120 is fitted to a portion located on the second side in the valve axis direction in the surrounding wall portion 110. A current flows through the coil 120 (the coil is excited) on the basis of a current signal (DUTY signal) calculated by the ECU 23.

The plunger 121 is arranged coaxially with the axial line O3 inside the coil 120. The plunger 121 is configured to be able to move in the valve axis direction by electromagnetic force Wa that acts between it and the coil 120.

The spool 103 is accommodated on the first side in the valve axis direction relative to the solenoid 102 in the valve body 100. The spool 103 switches communication and disconnection between the control port 112 and the control chamber S1 by moving in the valve axis direction in the valve body 100.

In the embodiment, the spool 103 is configured to be able to change the amount of communication between the control port 112 and the control chamber S1 in a non-stepwise manner in accordance with the amount of movement of the spool 103 in the valve axis direction.

The spool 103 has an axis portion 130 and a first valve seat portion 131 and a second valve seat portion 132 that are formed at both end portions of the axis portion 130 in the valve axis direction.

The axis portion 130 is arranged coaxially with the axial line O3. The axis portion 130 is formed into a tapered shape with a diameter that gradually increases toward the first side in the valve axis direction. A valve spring 135 is interposed between the end portion of the axis portion 130 on the first side in the valve axis direction and the plug body 101. A predetermined valve set load W2 is applied to the valve spring 135. That is, the valve spring 135 constantly biases the spool 103 toward the second side in the valve axis direction. The valve set load W2 can be adjusted in a non-stepwise manner by the amount of press-fitting of the plug body 101 to the valve body 100 or the like.

An end surface of the axis portion 130 on the second side in the valve axis direction acts in conjunction with the aforementioned plunger 121. Therefore, the spool 103 is configured to be able to move in the valve axis direction in the valve body 100 with movement of the plunger 121 (electromagnetic force Wa).

The first valve seat portion 131 stretches outward in a valve radial direction perpendicularly intersecting the axial line O3 from the end portion of the axis portion 130 on the first side in the valve axis direction. The outer circumferential surface of the first valve seat portion 131 is configured to move along the inner circumferential surface of the surrounding wall portion 110 with the movement of the spool 103.

The second valve seat portion 132 stretches outward in the valve radial direction from the end portion of the axis portion 130 on the second side in the valve axis direction. The outer circumferential surface of the second valve seat portion 132 is configured to be able to move along the inner circumferential surface of the surrounding wall portion 110 with movement of the spool 103. The second valve seat portion 132 is at a position closer to the second side in the valve axis direction than to the input port 111 regardless of the position of the spool 103.

The outer diameter of the first valve seat portion 131 is greater than the outer diameter of the second valve seat portion 132 by about several tenths of a millimeter.

A portion surrounded by the axis portion 130 of the spool 103, the valve seat portions 131 and 132, and the surrounding wall portion 110 defines an input chamber S5. The oil flows from the main gallery 16 into the input chamber S5 through the input port 111. In the embodiment, the aforementioned first valve seat portion 131 moves between an opening position for causing the input chamber S5 to communicate with the control port 112 (see FIG. 2) and a blocking position for blocking the communication between the input chamber S5 and the control port 112 (see FIG. 1) with the movement of the spool 103. At the opening position, it is only necessary that at least part of the control port 112 be opened to the input chamber S5. That is, in the embodiment, the amount of communication between the control port 112 and the control chamber S1 (the opening area of the control port 112 opening to the input chamber S5) changes in accordance with the amount of movement of the spool 103 in the valve axis direction at the opening position, thereby enabling non-stepwise change in the control pressure Pa.

Surfaces of the valve seat portions 131 and 132, which define the input chamber S5, (surfaces facing in the valve axis direction) function as pressure receiving surfaces 131a and 132a that receive pressure occurring in the input chamber S5 (hereinafter referred to as an "input pressure Pc"). In the embodiment, the input pressure Pc can be regarded as being equivalent to the ejection pressure Pb and the pressure in the main gallery 16 (hereinafter referred to as a "main gallery pressure Pd").

In the embodiment, the first pressure receiving surface 131a is larger than the second pressure receiving surface 132a. This is because the outer diameter of the first valve seat portion 131 is greater than the outer diameter of the second valve seat portion 132. Therefore, a load acting on the first pressure receiving surface 131a due to the input pressure Pc (hereinafter referred to as an "input load W3") is greater than the load acting on the second pressure receiving surface 132a. That is, the electromagnetic force Wa and the input load W3 are configured to act in the same direction in the embodiment.

Next, operations of the variable displacement pump 21 and the solenoid valve 22 will be briefly described.

As illustrated in FIG. 2, the spool 103 is pressed toward the opening position by resultant force W4 in a case in which the resultant force W4 of the electromagnetic force Wa and the input load W3 is greater than the valve set load W2 in the solenoid valve 22 according to the embodiment. That is, if the input pressure Pc for moving the spool 103 to the opening position is assumed to be an opening pressure Pc1, the electromagnetic force Wa increases as a current value I increases. Therefore, the spool 103 can move even if the opening pressure Pc1 (input load W3) drops.

Then, in a case in which the resultant force W4 is equal to or greater than a predetermined communication threshold value, the control port 112 is opened, and the input chamber S5 communicates with the control chamber S1. Then, the oil flows into the control chamber S1 of the variable displacement pump 21 through the control flow path 77 by the input chamber S5 communicating with the control chamber S1. The solenoid valve 22 is set such that the spool 103 moves to the opening position with only the opening pressure Pc1 (even if the coil 120 is in a non-conductive state) in a case in which the input pressure Pc exceeds a predetermined opening pressure Pc1.

The control pressure Pa increases by the oil flowing into the control chamber S1 in the aforementioned variable displacement pump 21. As illustrated in FIG. 1, in a case in which a load acting on the control surface 32a du to the control pressure Pa (hereinafter referred to as a "control load W5") is equal to or less than the cam set load W1, the control surface 32a has approached the inner surface of the fourth wall portion 74 to the maximum extent as illustrated in FIG. 1. Therefore, the amount of ejection from the variable displacement pump 21 becomes the maximum as described above.

If the control load W5 becomes greater than the cam set load W1 as illustrated in FIG. 2, the cam ring 32 slides in a direction in which the control chamber S1 is caused to expand. In accordance with this, the amount of ejection when the variable displacement pump 21 rotates once decreases by the guide ring 83 moving in a direction in which the amounts of eccentricity of the axial lines O1 and O2 decrease.

As described above, the amount of ejection from the variable displacement pump 21 is controlled by the resultant force W4 of the electromagnetic force Wa and the input load W3 obtained by the solenoid 102 in the hydraulic control apparatus 3 according to the embodiment. In this manner, the hydraulic control apparatus 3 can adjust the amount of ejection when the engine 2 rotates once regardless of the rotational speed of the engine 2. Since the electromagnetic force Wa becomes zero if the solenoid 102 is out of order, the resultant force W4 also becomes small, and the control pressure Pa also drops. In this manner, the control chamber S1 contracts, and the amount of oil ejected when the variable displacement pump 21 rotates once and/or the ejection pressure increases. Therefore, it is possible to protect the engine 2 even if the solenoid 102 is out of order.

<ECU>

Figure 3:
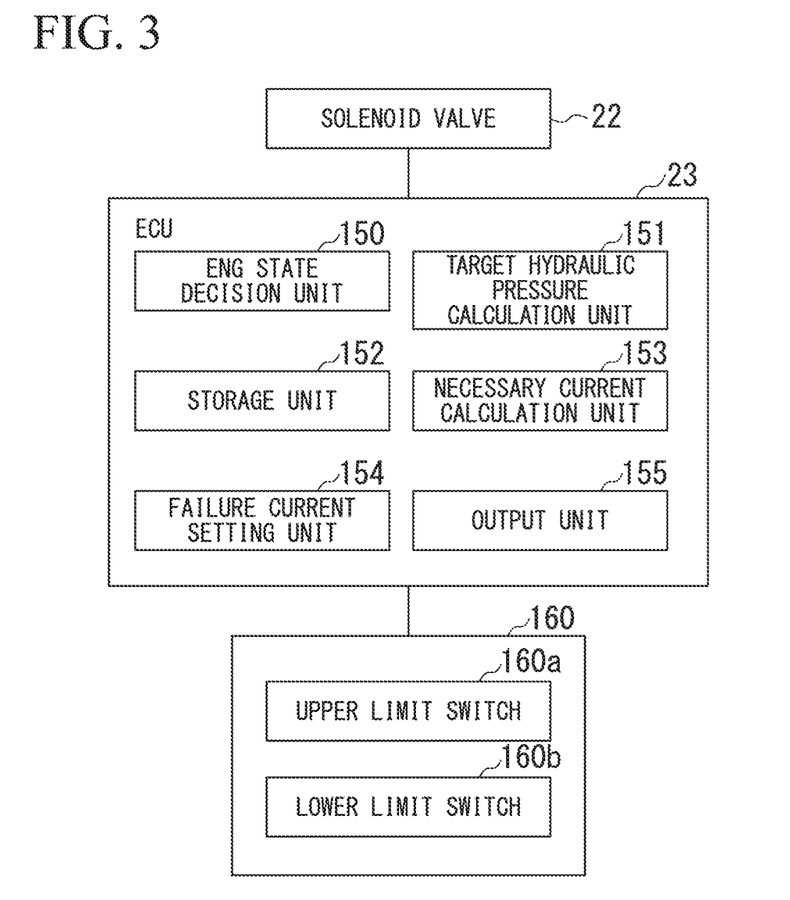
FIG. 3 is a block diagram of an ECU according to an embodiment.

FIG. 3 is a block diagram of the ECU 23.

As illustrated in FIG. 3, the ECU 23 has an ENG state decision unit 150, a target hydraulic pressure calculation unit 151, a storage unit 152, a necessary current calculation unit 153, a failure current setting unit 154, and an output unit 155. The ECU 23 includes an electronic circuit unit including a CPU, a RAM, a ROM, an interface circuit, and the like.

The ENG state decision unit 150 decides an ENG parameter indicating a state of the engine 2. The ENG parameter is decided according to a load on the engine 2, an accelerator position, a temperature (an outside temperature or an oil temperature), an atmospheric pressure, or the like, for example.

The target hydraulic pressure calculation unit 151 calculates a target hydraulic pressure value Pd1 of the main gallery pressure Pd on the basis of a target hydraulic pressure map stored in the storage unit 152, for example. The target hydraulic pressure map decides a correlation between the aforementioned ENG parameter and the target hydraulic pressure value Pd1, for example, through simulation or the like in advance. Specifically, the target hydraulic pressure map is set such that the target hydraulic pressure value Pd1 increases as the ENG parameter increases (for example, as the load on the engine 2 increases).

The necessary current calculation unit 153 calculates a current value necessary to achieve the target hydraulic pressure value Pd1 (hereinafter referred to as a "necessary current value Ia") on the basis of the necessary current map stored in the storage unit 152. The necessary current map decides a correlation between the aforementioned target hydraulic pressure value Pd1 and the necessary current value Ia through simulation or the like in advance. Specifically, the necessary current map is set such that the necessary current value Ia decreases as the target hydraulic pressure value Pd 1 increases.

Figure 4:
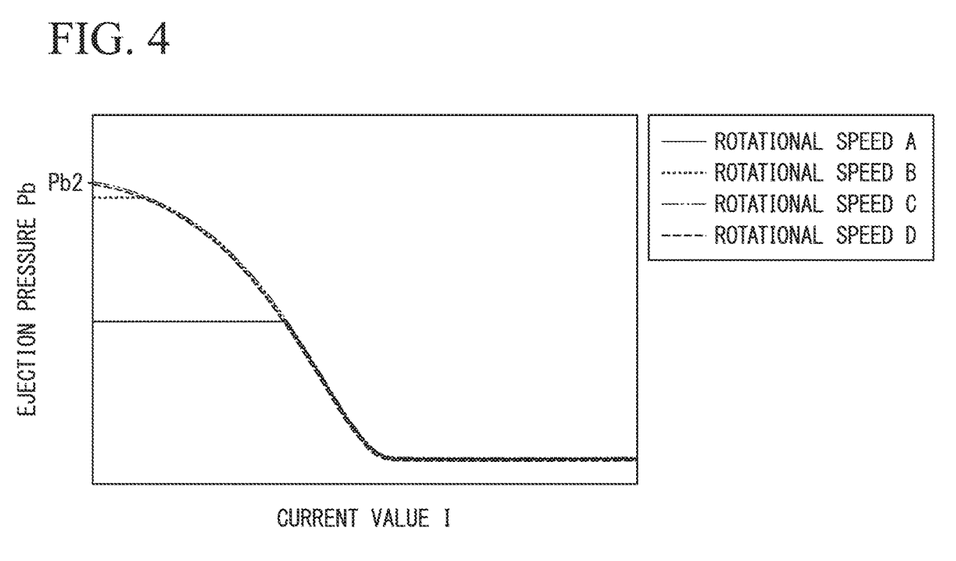
FIG. 4 is a graph illustrating a correlation between a current value I and an ejection pressure Pb for each rotational speed.

A method of setting the necessary current map will be described. FIG. 4 is a graph illustrating a correlation between a value of a current I that flows through the coil 120 and the ejection pressure Pb (called IP characteristics) for each rotational speed.

Figure 5:
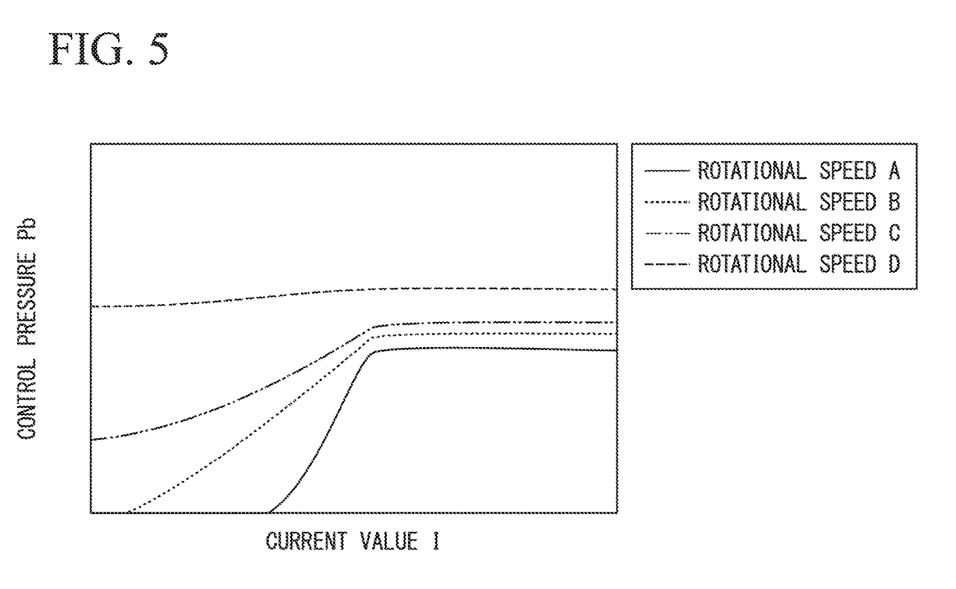
FIG. 5 is a graph illustrating a relationship between the current value I and a control pressure Pa for each rotational speed.

FIG. 5 is a graph illustrating a relationship between the current value I and the control pressure Pa for each rotational speed. In FIGS. 4 and 5, the rotational speed increases in an order of rotational speeds A to D. In this case, the rotational speeds A and B are in a low rotation region, and the rotational speeds C and D are in a mid-to-high rotation region (equal to or greater than 1000 rpm, for example). As described above, the ejection pressure Pb can be regarded as being equivalent to the main gallery pressure Pd and the input pressure Pc.

As illustrated in FIG. 4, the maximum ejection pressure Pb 2 in the non-conductive state in the mid-to-high rotation region is set to be constant in the hydraulic control apparatus 3 according to the embodiment. This is because the main gallery pressure Pd reaches the opening pressure Pc1 even in the non-conductive state in a case in which the main gallery pressure Pd increases due to the rotation of the variable displacement pump 21 in accordance with the rotational speed of the engine 2 in the mid-to-high rotation region.

A different control pressure Pa is input to the control chamber S1 in accordance with the rotational speed of the engine 2 in the non-conductive state as illustrated in FIG. 5. In this case, the amounts of eccentricity of the axial lines O1 and O2 change in accordance with the rotational speed. Specifically, the amount of ejection increases by the amounts of eccentricity of the axial lines O1 and O2 decreasing as the control pressure Pa increases (as the rotational speed increases). That is, the amount of ejection when the engine 2 rotates once decreases by the control pressure Pa increasing even if the rotational speed of the variable displacement pump 21 increases as the rotational speed of the engine 2 increases. Therefore, the maximum ejection pressure Pb2 in the non-conductive state is set to be constant regardless of the rotational speed of the engine 2 in the mid-to-high rotation region.

In the variable displacement pump 21 according to the embodiment, the amount of ejection from the variable displacement pump 21 is controlled by the resultant force W4 of the electromagnetic force Wa and the input load W3 obtained by the solenoid 102 as described above. Specifically, the control pressure Pa increases by a stroke of the spool 103 increasing as the current value I increases as illustrated in FIG. 5. In this manner, it is possible to cause the amount of ejection of the variable displacement pump 21 to decrease as the current value I is caused to increase. Therefore, the ejection pressure Pb decreases as the current value I increases as illustrated in FIG. 4.

As described above, the same IP characteristics are shown in the embodiment, particularly in the mid-to-high rotation region. Therefore, the necessary current map that follows the IP characteristics is set in the embodiment. That is, the necessary current map is set such that the necessary current value Ia decreases as the target hydraulic pressure value Pd1 increases.

As illustrated in FIG. 4, the ejection pressure Pb in the non-conductive state is less than the maximum ejection pressure Pb2 in the low rotational speed region. In this case, since the ejection pressure Pb does not reach the opening pressure Pb 1 (since the control port 112 is not opened), the control pressure Pa does not occur. That is, the oil is sent from the variable displacement pump 21 at the ejection pressure Pb in accordance with the rotational speed of the engine 2 in the low rotation region. Therefore, there is no problem if the necessary current map is separately set in the low rotation region. IP characteristics similar to those in the mid-to-high rotation are shown even in the low rotational speed region after the control port 112 is opened by the resultant force W4.

As illustrated in FIG. 3, the failure current setting unit 154 sets failure current values (a boosted current value Ib and a reduced current value Ic) on the basis of a detection result of a pressure switch 160 provided at a branching portion between the main gallery 16 and the input flow path 115 as illustrated in FIG. 1. The pressure switch 160 according to the embodiment has an upper limit switch 160a and a lower limit switch 160b.

The upper limit switch 160a turns on in a case in which the main gallery pressure Pd exceeds a predetermined upper limit gallery pressure Pdmax.

The lower limit switch 160b turns on when the main gallery pressure Pd falls below a predetermined lower limit gallery pressure Pdmin.

The failure current setting unit 154 sets the boosted current value Ib that is higher than a present current value I in a case in which it is determined that the upper limit switch 160a is in the on state. That is, in a case in which the upper limit switch 160a is in the on state, it is determined that the main gallery pressure Pd has increased for some reason (for example, an inadvertent operation due foreign matter biting into the cam ring 32 or the spool 103). Therefore, the cam ring 32 is caused to move in a direction in which the amounts of eccentricity of the axial lines O1 and O2 contract, and the amount of ejection is reduced by setting the value of the current I that is caused to flow through the coil 120 to the boosted current value Ib.

In a case in which it is determined that the lower limit switch 160b is in the on state, the failure current setting unit 154 sets the reduced current value Ic that is lower than the present current value I. That is, in a case in which the lower limit switch 160b is in the on state, it is determined that the main gallery pressure Pd has decreased for some reason. Therefore, the cam ring 32 is caused to move in a direction in which the amounts of eccentricity of the axial lines O1 and O2 expand, and the amount of ejection is caused to increase by setting the value of the current I that is caused to flow through the coil 120 to the reduced current value Ic.

The output unit 155 outputs a current signal based on the current value I set by the aforementioned necessary current calculation unit 153 and the failure current setting unit 154 to the solenoid valve 22 (coil 120).

[Hydraulic Control Method]

Figure 6:
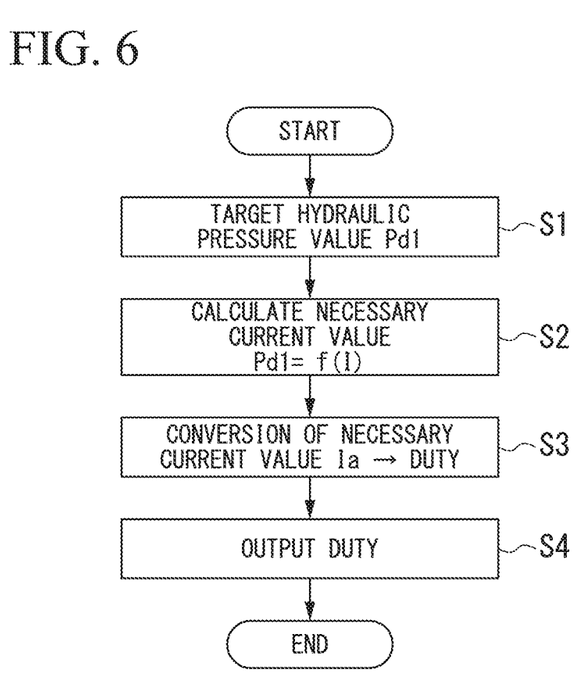
FIG. 6 is a flowchart for explaining a hydraulic control method.

Next, a hydraulic control method performed by the aforementioned hydraulic control apparatus 3 will be described. FIG. 6 is a flowchart for explaining the hydraulic control method.

In Step S1 illustrated in FIG. 6, the target hydraulic pressure calculation unit 151 calculates the target hydraulic pressure value Pd 1 first (target hydraulic pressure value calculation step). The target hydraulic pressure value Pd1 performs calculation on the basis of the target hydraulic pressure map stored in the storage unit 152 as described above.

Next, in Step S2, the necessary current calculation unit 153 calculates the necessary current value Ia (necessary current value calculation step). The necessary current value Ia is calculated on the basis of the necessary current map stored in the storage unit 152 as described above. Specifically, in a case in which the target hydraulic pressure value Pd 1 is equal to or greater than the maximum ejection pressure Pb2, the necessary current value Ia becomes zero. In this case, the amount of ejection of the variable displacement pump 21 is adjusted by the volume in the control chamber S1 changing in accordance with the rotational speed as described above. Therefore, in a case in which the rotational speed of the engine 2 is equal to or greater than a specific rotational speed, the main gallery pressure can be maintained substantially constant regardless of the rotational speed of the engine 2.

On the other hand, in a case in which the target hydraulic pressure value Pd1 is less than the maximum ejection pressure Pb2, the necessary current value Ia based on the necessary current map changes. That is, the necessary current calculation unit 153 calculates the necessary current value Ia to be higher as the target hydraulic pressure value Pd1 decreases.

Then, the ECU 23 performs DUTY conversion on the aforementioned necessary current value Ia in Step S3. Thereafter, the ECU 23 outputs a current signal based on the necessary current value Ia to the coil 120 via the output unit 155 in Step S4.

The stroke of the spool 103 increases when the spool 103 is pressed by the resultant force W4 of the electromagnetic force Wa and the input load W3 due to the necessary current value Ia flowing through the coil 120.

In this manner, it is possible to reduce the amount of ejection of the variable displacement pump 21 by the control pressure Pa increasing. Therefore, the main gallery pressure Pd approaches the target hydraulic pressure value Pd1 as a result of the decrease in the ejection pressure Pb with the increase in the current value I.

In this manner, the ECU 23 is configured to calculate the target hydraulic pressure value Pd1 on the basis of the ENG parameter indicating a state of the engine 2 and calculate the necessary current value Ia on the basis of the necessary current map indicating the correlation between the ENG parameter and the necessary current value Ia in the embodiment.

According to this configuration, since the current of the necessary current value Ia calculated on the basis of the necessary current map is caused to flow through the solenoid valve 22, it is possible to cause the main gallery pressure Pd to quickly approach the required target hydraulic pressure value Pd1. In this case, it is possible to satisfy transient characteristics at a lower cost with more simplified control as compared with a case in which the necessary current value is constantly changed on the basis of the target hydraulic pressure value and the actually measured hydraulic pressure value as in the feedback control. As a result, it is possible to supply the oil to the engine 2 at the desired hydraulic pressure.

In the embodiment, a configuration in which the necessary current map is set such that the necessary current value Ia decreases as the target hydraulic pressure value Pd1 increases is employed.

With this configuration, since the target hydraulic pressure value Pd1 decreases when the necessary current value Ia is increased, it is possible to supply the oil to the engine 2 at the desired hydraulic pressure regardless of the rotational speed of the engine 2. In particular, it is possible to further simplify control by controlling the solenoid valve 22 on the basis of the same IP characteristics regardless of the rotational speed of the engine 2 in a predetermined rotational speed region.

In the embodiment, a configuration in which the mutually facing surfaces among the outer circumferential surfaces of the cam ring 32 are set to the pressure receiving surface 32c and the pressing surface 32b is employed.

With this configuration, it is possible to press the pressing surface 32b against the inner surface of the first wall portion 51 with a pressing load acting on the pressure receiving surface 32c due to the ejection pressure Pb. In this manner, it is possible to reliably seal the control chamber S1 and the suction port 52.

In the embodiment, a configuration in which the current that is caused to flow through the coil 120 is reduced in a case in which the main gallery pressure Pd falls below the lower limit gallery pressure Pdmin is employed.

With this configuration, it is possible to cause the opening pressure Pc1 to increase by setting the value of the current I that flows through the coil 120 to the reduced current value Ic and to thereby forcibly cause the amount of ejection to increase regardless of the target hydraulic pressure value Pd1. In this manner, it is possible to prevent the main gallery pressure Pd from being in an extremely low state and to maintain the main gallery pressure Pd within a desired range.

In the embodiment, a configuration in which the current that is caused to flow through the coil 120 is caused to increase in a case in which the main gallery pressure Pd becomes greater than the upper limit gallery pressure Pdmax is employed.

With this configuration, it is possible to cause the opening pressure Pc1 to decrease by setting the value of the current I that flows through the coil 120 to the boosted current value Ib and to thereby forcibly reduce the amount of ejection regardless of the target hydraulic pressure value Pd1. In this manner, it is possible to prevent the main gallery pressure Pd from being in an extremely high state and to maintain the main gallery pressure Pd within a desired range.

It is possible to secure the advantage in terms of cost as compared with a case in which a pressure sensor is provided as in feedback control even if the pressure switch 160 is provided since the pressure switch 160 is relatively inexpensive.

The technical scope of the present invention is not limited to the aforementioned embodiment and includes various modifications added to the aforementioned embodiment without departing from the gist of the present invention.

For example, although the case in which the engine is an example of the supply destination unit to which the oil is supplied by the hydraulic control apparatus has been described in the aforementioned embodiment, the supply destination unit may be a component other than the engine (for example, a transmission, a differential gear, a brake, or the like).

Although the case in which the vane pump is used as the variable displacement pump has been described in the aforementioned embodiment, a gear pump, a trochoid pump, or the like capable of changing the amount of ejected oil and/or the ejection pressure by changing the hydraulic pressure in the control chamber may be employed.

Although the configuration in which two pressure switches 160 are provided for a fail-safe purpose has been described in the aforementioned embodiment, the present invention is not limited only to this configuration. For example, only one of the upper limit switch 160a and the lower limit switch 160b may be used as the pressure switch 160, or a configuration with no pressure switch 160 is also possible.

Although the configuration in which the electromagnetic force Wa and the input load W3 act in the same direction (the direction against bias force of the valve spring 135) has been described in the aforementioned embodiment, the present invention is not limited only to this configuration. A configuration in which the electromagnetic force Wa acts in the same direction as that of the bias force of the valve spring 135 is also possible. In this case, the necessary current map is preferably set such that the necessary current value Ia increases as the target hydraulic pressure value Pd1 increases.

In a case in which a change has occurred in the IP characteristics due to degradation or the like of the variable displacement pump 21 or the solenoid valve 22, the necessary current map may be corrected. As a method of correcting the map, the correction can be made with reference to an output value of the pressure switch 160, for example. In a case in which one pressure switch 160 is provided, one of the IP characteristics (maximum ejection pressure Pb2) is changed.

In a case in which two pressure switches 160 are provided, one of the IP characteristics and inclination (the amount of change in the target hydraulic pressure value Pd1 with respect to the necessary current value Ia) are changed.

In this manner, it is possible to prevent a deviation between the target hydraulic pressure value Pd1 and the main gallery pressure Pd and to reduce a loss in drive force, for example, for a long period of time.

Other replacements of the components in the aforementioned embodiment with known components can be appropriately performed without departing from the gist of the present invention, and the aforementioned modification examples may be appropriately combined. The present invention is not limited to the above description and is limited only by the appended claims.

What is claimed is:
1. A hydraulic control apparatus comprising:
an electromagnetic valve that has
    a solenoid including a coil,
    a cylindrical valve body connected to the solenoid,
    an input port which is provided in an open manner on the valve body and communicates with a supply destination unit of oil,
    a spool which is installed in a cylindrical portion of the valve body with a valve spring setting a threshold value for communication and is operated by a resultant force of a hydraulic pressure of the input port and an electromagnetic force of the coil exceeding the threshold value for communication, and
    a control port which is installed side by side with the input port in the valve body and in which a communication and a disconnection to the input port are switched by the spool;
a variable displacement pump which includes
    a housing that has a suction port communicating with a supply source of the oil and an ejection port communicating with the supply destination unit,
    a control chamber that is formed in the housing and communicates with the suction port, the ejection port, and the control port,
    a cam ring that is accommodated in the housing, sections the control chamber and the suction port, sections the control chamber and the ejection port, and is able to move in a direction in which the control chamber expands or contracts,
    a rotor configured to rotate about an axial line perpendicularly intersecting a direction, in which the cam ring is able to move, inside of the cam ring, and
    a plurality of vanes that are supported by the rotor to advance or retreat in a radial direction perpendicularly intersecting the axial line with a movement of the cam ring and that have outer end surfaces in the radial direction sliding an inner circumferential surface of the cam ring,
wherein an outer circumferential surface of the cam ring has
    a pressure receiving surface on which an ejection pressure of oil ejected from the ejection port acts, and
    a pressing surface that faces the pressure receiving surface and is pressed against an opening surface of the suction port in an inner surface of the housing in response to the ejection pressure, the rotor rotates in accordance with a rotation drive of the supply destination unit, and the variable displacement pump changes an amount of the oil ejected to the supply destination unit through the ejection port in accordance with a pressure in the control chamber by the control chamber expanding or contracting; and a control unit that is electrically connected to the coil and controls a value of a necessary current applying to the electromagnetic valve required for generating the electromagnetic force, wherein the control unit has a state decision unit configured to determine a parameter indicating a load state of the supply destination unit;

a target hydraulic pressure calculation unit configured to calculate a target hydraulic pressure value of the supply destination unit based on a target hydraulic pressure map indicating a correlation between the determined parameter indicating the load state and the target hydraulic pressure value, and a necessary current calculation unit configured to calculate the value of the necessary current based on a necessary current map indicating a correlation between the target hydraulic pressure value and the value of the necessary current.

2. The hydraulic control apparatus according to claim 1, wherein the necessary current map is set such that the value of the necessary current decreases as the target hydraulic pressure value increases.

3. A hydraulic control method for a hydraulic control apparatus including:

an electromagnetic valve that has a solenoid including a coil, a cylindrical valve body connected to the solenoid, an input port which is provided in an open manner on the valve body and communicates with a supply destination unit of oil, a spool which is installed in a cylindrical portion of the valve body with a valve spring setting a threshold value for communication and is operated by a resultant force of a hydraulic pressure of the input port and an electromagnetic force of the coil exceeding the threshold value for communication, and a control port which is installed side by side with the input port in the valve body and in which a communication and a disconnection to the input port are switched in a non-stepwise manner by the spool;

a variable displacement pump which has a suction port communicating with a supply source of the oil, an ejection port communicating with the supply destination unit, and a control chamber communicating with the control port, in which a rotor rotates in accordance with a rotation drive of the supply destination unit, and which changes an amount of the oil ejected to the supply destination unit through the ejection port in accordance with a pressure change in the control chamber; and a control unit that is electrically connected to the coil and controls a value of a necessary current applying to the electromagnetic valve required for generating the electromagnetic force, the method comprising causing the control unit to perform:

a step of determining a parameter indicating a load state of the supply destination unit;

a target hydraulic pressure value calculation step of calculating a target hydraulic pressure value of the supply destination unit based on a target hydraulic pressure map indicating a correlation between the determined parameter indicating the load state and the target hydraulic pressure value; and a necessary current value calculation step of calculating the value of the necessary current based on a necessary current map indicating a correlation between the target hydraulic pressure value and the value of the necessary current.

4. The hydraulic control method according to claim 3, wherein the method further comprises causing the control unit to perform:

a step of reading a signal of a lower limit switch which turns on in a case in which the hydraulic pressure of the supply destination unit falls below a lower limit threshold value, and a step of forcibly reducing a current applying to the electromagnetic valve regardless of the value of the necessary current when the read signal of the lower limit switch indicates that the lower limit switch turns on.

5. The hydraulic control method according to claim 3, wherein the method further comprises causing the control unit to perform:

a step of reading a signal of an upper limit switch which turns on in a case in which the hydraulic pressure of the supply destination unit exceeds an upper limit threshold value, and a step of forcibly increasing a current applying to the electromagnetic valve regardless of the value of the necessary current when the read signal of the upper limit switch indicates that the lower limit switch turns on.

* * * * *